United States Patent [19]

Ehrat

[11] 4,131,879

[45] Dec. 26, 1978

[54] METHOD AND APPARATUS FOR DETERMINING THE RELATIVE POSITIONS OF CORRESPONDING POINTS OR ZONES OF A SAMPLE AND AN ORGINAL

[75] Inventor: Kurt Ehrat, Steinmaur, Switzerland

[73] Assignee: Gretag Aktiengesellschaft, Regensdorf, Switzerland

[21] Appl. No.: 790,606

[22] Filed: Apr. 25, 1977

[30] Foreign Application Priority Data

Apr. 30, 1976 [CH] Switzerland .......................... 5449/76

[51] Int. Cl.[2] .............................................. G06K 9/04

[52] U.S. Cl. ............................ 340/146.3 H; 209/534; 340/146.3 Q

[58] Field of Search ............. 340/146.3 H, 146.3 MA, 340/146.3 AC, 146.3 Q, 146.3 R; 235/61.11 K; 209/DIG. 2; 194/4 F, DIG. 14

[56] References Cited

U.S. PATENT DOCUMENTS

| | | | |
|---|---|---|---|
| 3,636,513 | 1/1972 | Tisdale | 340/146.3 AC |
| 3,727,183 | 4/1973 | Lemay | 340/146.3 H |
| 3,748,644 | 7/1973 | Tisdale | 340/146.3 Q |
| 3,898,617 | 8/1975 | Kashioka et al. | 340/146.3 H |
| 4,014,000 | 3/1977 | Uno et al. | 340/146.3 Q |
| 4,021,778 | 5/1977 | Ueda et al. | 340/146.3 AC |

OTHER PUBLICATIONS

Barnea et al., "Algorithm For Fast Digital Image Registration", *IBM Tech. Disclosure Bulletin*, vol. 14, No. 4, Sep., 1971, pp. 1291-1294.

*Primary Examiner*—Leo H. Boudreau
*Attorney, Agent, or Firm*—Burns, Doane, Swecker & Mathis

[57] ABSTRACT

A method and apparatus for comparing a sample of printed material, such as a bank note, with a standard original print by scanning the sample and the original to provide reflectance values of text in corresponding zones in a preselected group of zones of a pattern, common to both original and sample and produced by selecting reflectance values occurring in selected parts of selected lines of scan. The difference in reflectance values of the text in corresponding zones of the preselected group of zones is obtained and from these differences the relative position of the corresponding text is determined. The relative position of the text in the remaining corresponding zones is then determined by interpolating or extrapolating the values representing the relative positions of the text in the selected zones of the group and from the reflectance values obtained from scanning those other corresponding zones. Instead of simultaneously scanning both sample and original, the original may be scanned first and the reflectance values stored, and then the sample scanned, the differences being obtained from the reflectance values produced while scanning and the stored reflectance values of corresponding zones.

30 Claims, 16 Drawing Figures

METHOD AND APPARATUS FOR DETERMINING THE RELATIVE POSITIONS OF CORRESPONDING POINTS OR ZONES OF A SAMPLE AND AN ORGINAL

FIELD OF THE INVENTION

This invention relates to a method of and apparatus for determining the relative positions of corresponding points or zones of a sample and an original. One of the most important requirements for mechanical comparison of a sample and an original, e.g. of a printed product and a standard print for assessment of print quality, is exact determination of the relative position of the comparative objects on comparison. Only if the relative position is accurately known is it possible for corresponding points on the sample and original to be clearly associated with one another and compared. The accuracy requirements in respect of relative position determination are particularly high, for example, in the quality control of banknotes. In such cases, even minor relative position errors might incorrectly be interpreted as printing errors and hence result in faulty assessment of the banknotes under investigation.

It is particularly difficult to determine the relative positions of printed products containing a number of partial texts printed one upon the other by different printing processes, e.g. offset printing, intaglio printing, or letterpress, as is the case, for example, with banknotes, the texts of which are usually made in two or three different printing operations. The term "text" as used in this context denotes the actual printed matter which may be in the form of words, illustrations or indicia. The partial texts originating from the individual printing operations may be offset from one another from one banknote to another by as much as 1.5 mm due to irregular distortion of the text, uneven paper compression, and so on. Displacements of this kind are permissible and should not therefore be interpreted as printing errors, but they must be taken into account in determining the relative positions.

Another difficulty in determining the relative positions is that samples may be unevenly distorted so that different points or zones of the sample have different relative positions to the corresponding points or zones of the original. In such cases, determining the relative position of the sample in relation to the original by reference, for example, to two edges of the text would be inadequate, since points of the text situated just a short distance from the edges of the text and in the interior of the text may have relative positions which are distinctly different from the points of the text at the edges.

PRIOR ART

The known methods of cross-correlation or minimum error square sum can of themselves be used to determine the relative positions, but with the known relative position measuring processes using these methods all or at least most of the original or sample text points are used for evaluation. Apart from the great technical outlay required for these methods, however, relatively long computing times are required to determine the maximum correlation values or the minimum error square sum even with the most up-to-date technology. In practice, therefore, these known methods are unsuitable, at least in those cases in which very short computing times are required. Short computing or processing times are an essential condition for high capacity testing of samples on comparison or testing machines. It is only the high testing capacity that makes use of testing machines logical or economic.

OBJECT OF THE INVENTION

The object of the invention therefore is to provide a method which obviates at least the most serious of the above difficulties and allows for short computing times.

SUMMARY OF THE INVENTION

The method according to the invention selects individual positioning text zones which are comparatively small with respect to the total original and sample area equally from the sample and the original, the relative positions of the corresponding positioning text zones of the sample and original are determined, and the relative positions of the other points of the test are determined by interpolation and extrapolation from these relative positions.

The number of positioning text zones may be between 2 and 40, preferably between about 10 and 20. The total area of the positioning text zones is advantageously about 0.5% to 10%, preferably about 1% of the total original area. This corresponds to an area of an individual position text zone of about 0.02% to 2%, preferably about 0.1% to 0.2% of the total original area.

According to a preferred embodiment of the method according to the invention, the sample and the original are scanned pointwise, and the relative positions of the positioning text zones are determined by comparing the scanned values at corresponding raster points associated with raster zones selected to correspond to the positioning text zones. This can be effected by cross-correlation or the minimum error square sum method. Preferably, however, the differences between the scanned values of corresponding raster points of the sample and original are formed for each raster zone, positive and negative differences are summated individually over each individual raster zone, and the positive and negative sum values determined are used as a measure of the relative positions to be determined.

According to another preferred embodiment of the invention where a sample representing a printed product has contents applied by different printing processes, a predetermined relative association of the text points in separate originals having different contents according to the different printing processes are used and the relative positions of the text points of the sample to those of the originals are determined separately for each original.

The invention also relates to apparatus for performing the method, and comprises a first point scanning device for generating scan values at each individual scanning raster point, a second scanning device which produces a scanning raster, identical to the first or a first store having a number of storage places equivalent to the number of scanning raster points and which is adapted to be connected to the first scanning device; and a logic operation stage connected after the first scanning device and the second scanning device or the first store for associating the scanned values of the first scanning device and of the second scanning device or the first store, wherein the logic operation stage is preceded by a selection stage which selects from all the scanned values at any time only those which originate from predetermined raster points or storage places associated with individual raster zones. The logic operation stage is constructed as a subtraction circuit for forming the differences between the selected scanned values from the first scanning device and the second scanning device or the first store. The logic operation stage is followed by a summation stage controlled by the selection stage for forming for the raster points of each raster zone sum values of positive and negative scanned value differences separately according to the sign. A very advantageous embodiment of the invention has a store following the summation stage for storing the sum values of the individual raster zones and by a position computer which is connected to the store and which forms a predetermined number of position values $P_j$ from the individual sum values $S_i$ in accordance with the equation $P_j = {}_i\Sigma K_{ij} \cdot S_i$.

BRIEF DESCRIPTION OF DRAWINGS

A preferred embodiment of the invention will be explained in detail hereinafter with reference to the accompanying drawings wherein:

FIGS. 3*a* to 8*c* are examples of raster zones and their reflectance curves.

DETAILED DESCRIPTION OF PREFERRED EMBODIMENTS

Figure 1:
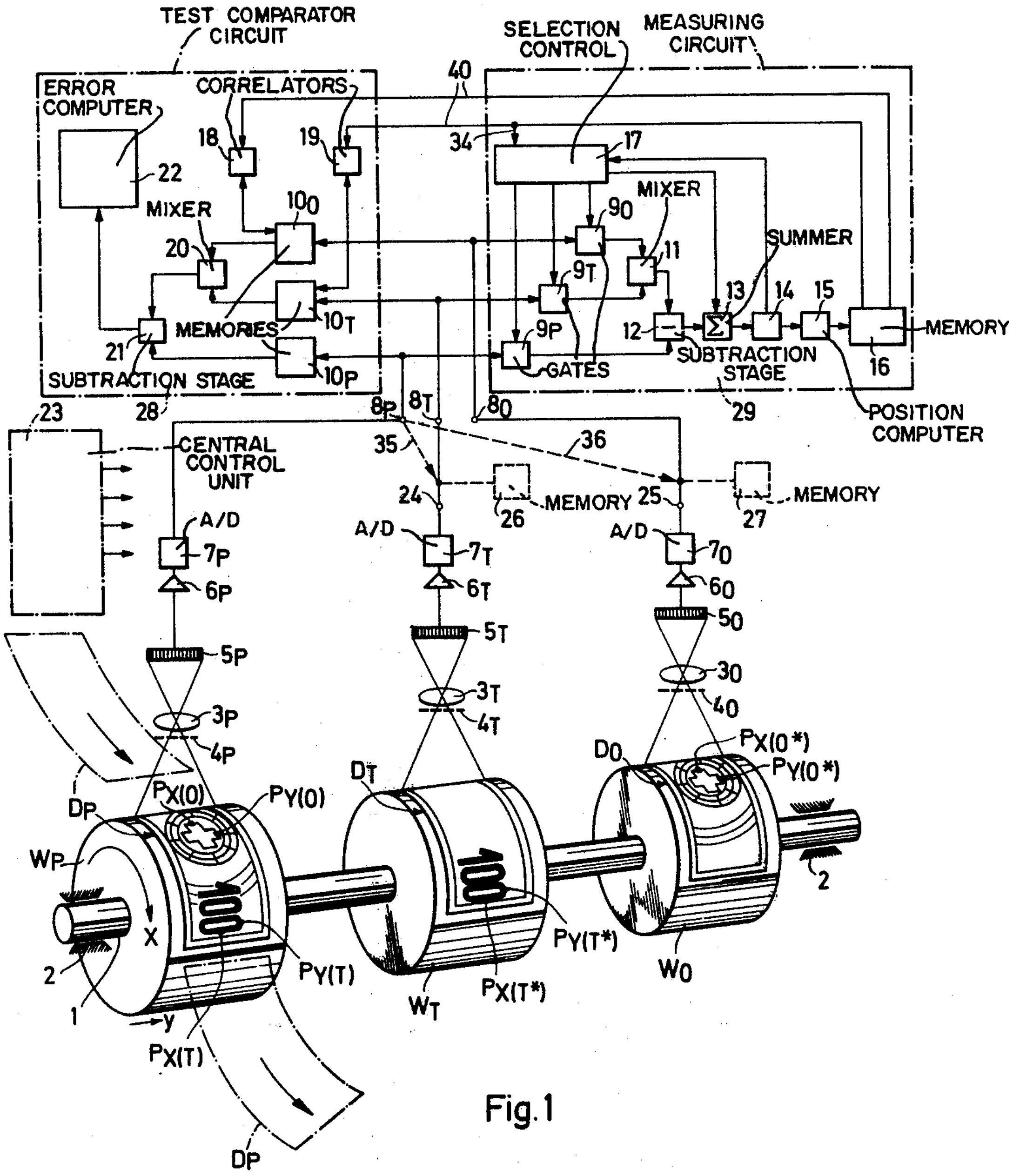
FIG. 1 is a block schematic diagram of one embodiment of apparatus according to the invention.

The apparatus illustrated in FIG. 1 is intended for printed products having text applied by two different printing methods. For example, they may be banknotes, as illustrated, which have an offset printed text and an intaglio printed text. As already stated, two separate originals, each containing only the information required for each individual printing method, as used for printed products of this kind and the relative positions of the printed product under test are determined separately with respect to each original. Accordingly, the apparatus is provided with three identical scanning systems, one for the sample under test $D_P$, one for the original $D_T$ bearing the intaglio printed text, and one for the original $D_O$ with the offset printed text. If the sample $D_P$ contains other information printed by different methods (e.g. letter-press) in addition to the intaglio and offset printed information, then a corresponding number of additional scanning systems would have to be provided for the additional originals.

The subscripts P, T, O to the reference numerals used in the drawings relate to the sample (P), the intaglio original (T) and the offset original (O), but for the sake of simplicity they are omitted hereinafter where there is no risk of confusion.

The scanning systems for the sample $D_P$ and the originals $D_T$ and $D_O$ each comprise a gripper drum W, the drums being fixed on a common shaft 1 mounted for rotation in bearings 2 and driven in the direction of arrow X via a motor (not shown), an imaging optical system 3 with an aperture diaphragm 4, photoelectric transducers 5, an amplifier 6 and an A/D converter 7.

The gripper drums are suction drums known per se, having suction slots recessed into their circumference and connected to a suction source (not shown). A particularly advantageous and convenient gripper drum of this type is described in German Patent Application P 255 2300.6, which corresponds to U.S. Pat. Appl. Ser. No. 729,152 of Oct. 4, 1976.

The photoelectric transducers are arrays of photodiodes comprising a plurality of single diodes disposed in a straight line. These photo-diode arrays are arranged parallel to the drum axes and receive the light reflected from each generatrix of the prints fixed on the gripper drums. The illumination source for the prints has been omitted for the sake of clarity.

The positions of the scanning raster points, and hence the scanning raster, are fixed by the distances between the individual diodes of the arrays and by the speed of revolution of the gripper drums. A central control unit 23 ensures that each individual diode of the arrays is interrogated once during the rotation of the drums over a distance corresponding to the distance between two lines of the raster. The electrical signals produced by the individual photodiodes are fed to the amplifiers 6 and, after amplification, are digitalized in the analog/-digital converters 7. The reflectance values of the individual raster points of the prints being scanned then appear in sequence line by line on the raster at the outputs 8 of the A/D converters 7, in the form of electrical digital signals.

As shown in broken lines in FIG. 1, the individual scanning systems for the two originals $D_T$ and $D_O$ could be replaced by stores 26 and 27 having a number of storage spaces corresponding to the number of points in the scanning raster of the remaining scanning system for the sample. The two originals $D_T$ and $D_O$ would then have to be scanned, before the actual test is carried out, by means of the sample scanning system, and the resultant reflectance values stored in the stores 26 and 27, from which they could then be withdrawn for further processing.

The prints may be scanned not only to determine the brightness of the reflected light, but also to determine its colour composition. This would be somewhat more expensive, since a separate scanning system would be required for each colour. Theoretically, however, it would proceed in the same way as the monochrome scanning described here.

The relative positions of corresponding zones on the originals and the sample are determined in a measuring circuit having the general reference 29. This circuit comprises three gates $9_P$, $9_T$ and $9_O$, controlled by a control stage 17, a mixer stage 11, a subtraction stage 12, a summation stage 13 also controlled by control stage 17, a store 14, a position computer 15 and a position store 16.

Stage 17 controls the gates 9 so that only reflectance values of raster points associated in each case with specific zones of the raster can pass to the mixer stage 11 and subtraction stage 12. In the mixer stage 11 the reflectance values passed by the gates $9_T$ and $9_O$ are associated with one another so that the resulting mixed product is directly comparable with the reflectance values passed by the gate $9_P$. This allows for the fact that the originals each have only one text, while the sample contains two texts printed one on top of the other. The mixer stage 11 electronically simulates an original having two texts printed one on top of the other. The mixer stage 11 is, in practice a multiplication circuit. The reflectance values of the raster points of the originals as selected by the control stage 17 mixed in the mixer stage 11 are subtracted from the reflectance values of the corresponding raster points of the sample in the subtraction stage 12.

The resulting reflectance difference values are added separately by sign in the summation stage 13 over a given group of raster points in a raster zone. The resulting negative and positive totals are stored temporarily in a stage of the store 14. A series of position values $P_j$ is formed in the position computer 15 from the stored totals by interpolation and extrapolation and this series is loaded in the position store 16 from which it can be called therefrom via lines 40 for evaluation purposes, e.g. for reflectance value correction on text comparison. The block schematic diagram of an apparatus for these operations is shown in the top left-hand part of FIG. 1 and will be explained hereinafter.

Figure 13:
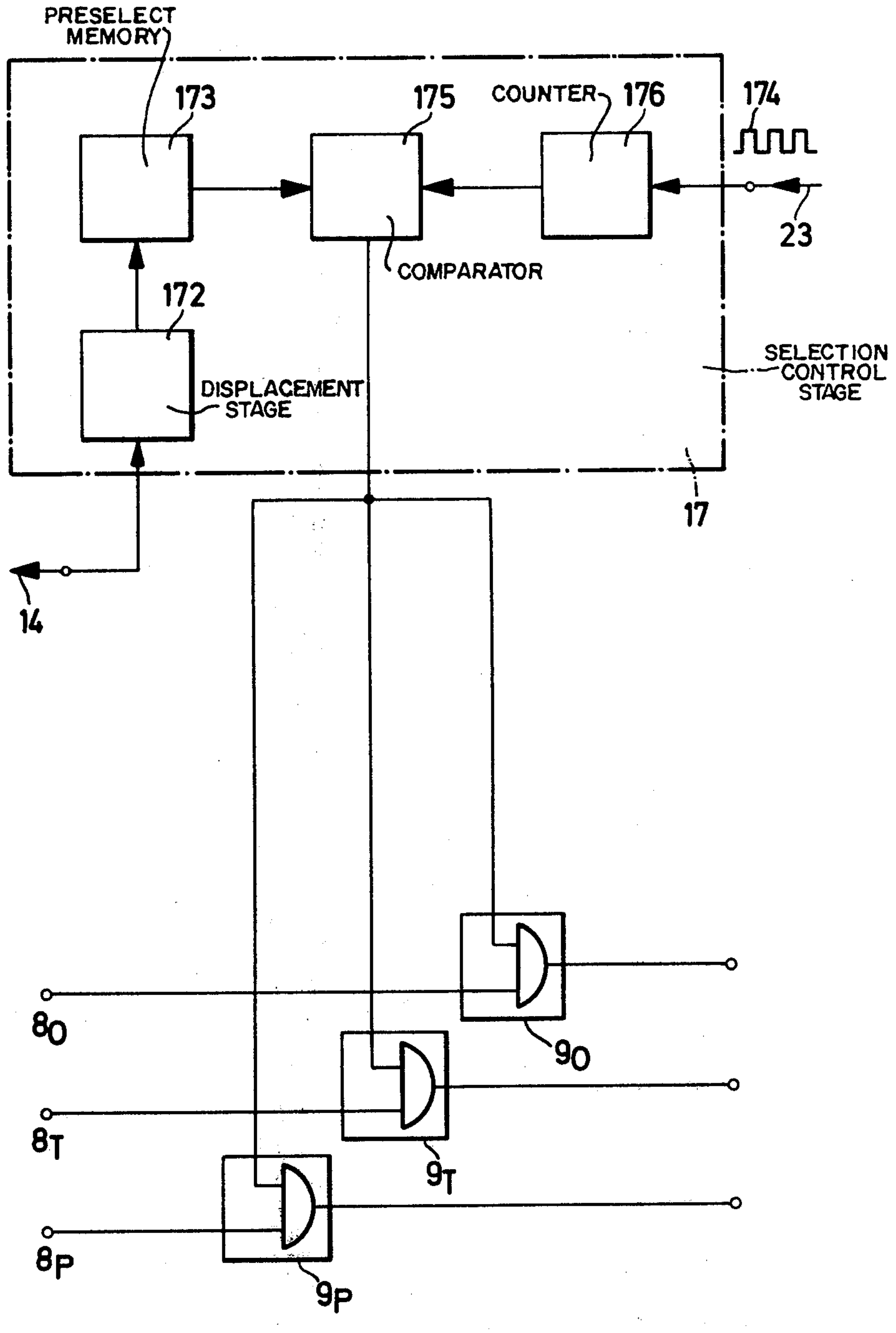

FIG. 13 shows a preferred embodiment of the control stage 17 in detail. The control stage 17 is substantially a correctable preselection counter and comprises a correctable preselection store 173, a comparator 175, a counter 176 and a raster zone displacement stage 172. The counting cadence 174 coinciding with the scanning cadence is fed from the central control unit 23. The serial numbers of all those raster points whose associated scanned reflectance values are to be processed further, are stored in the preselection store 173. As soon as the counter 176 reaches one of these stored numbers, the comparator 175 emits a pulse which opens the gate 9 for the associated raster point. The preselection store 173 is correctable, i.e., the serial numbers can be increased or reduced by specific amounts by the application of a suitable correction signal. Certain summation values selected from those stored in the store 14 are used to produce this correction signal by means of the raster zone displacement stage 172, as will be explained hereinafter.

Figure 11:
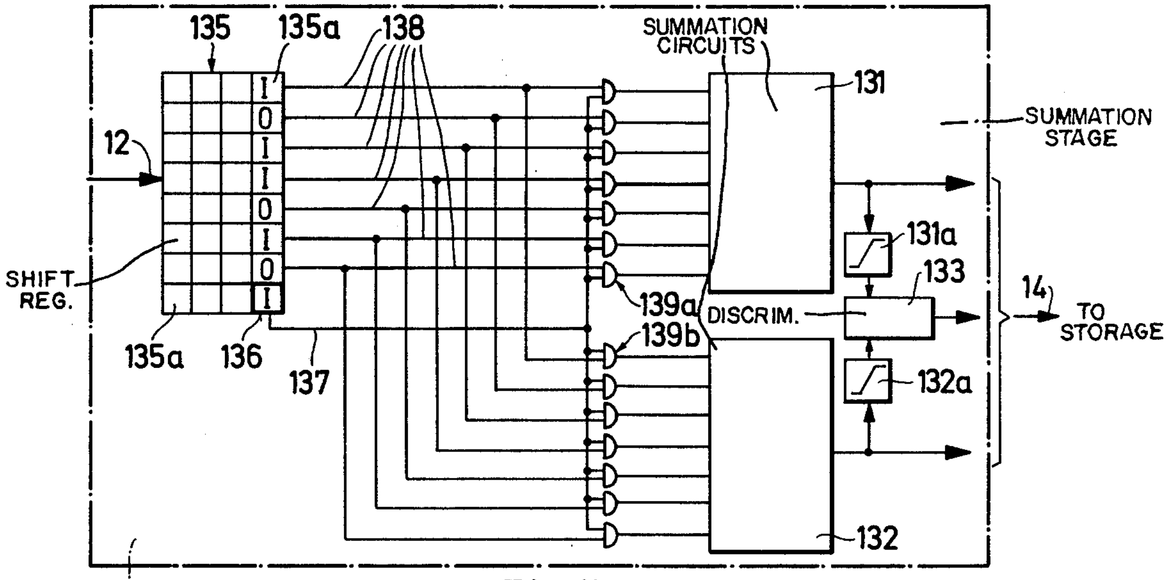
FIGS. 11–13 are block schematic diagrams of various details of FIG. 1.

FIG. 11 shows an embodiment of the summation stage 13 in greater detail. It comprises a shift register 135, two groups of gate circuits 139*a* and 139*b* each connected, via lines 137, 138, to an output of the shift register, two summation circuits 131, 132 each connected to one of the gate circuit groups, two threshold detectors 131*a* and 132*a* connected to the summation circuits, and a discriminator circuit 133 connected to the threshold detectors.

The reflectance differences arriving from the subtraction stage 12 pass to the shift register 135. For example, a reflectance difference indicated by the binary digit series 1011010 is shown in the stage furthest right of the stages of register 135. The eighth bit 136 forms a sign bit, "I" denoting positive and "0" denoting negative differential values. The information from shift register 135 passes via the gate circuits 139*a* or 139*b* to the summation circuit 131 or 132 depending upon which of the gate circuits is just opened by the sign bit 136. In this way, only the positive reflectance differences are added in the summation circuit 131, and only the negative in the summation circuit 132.

The threshold detectors 131*a* and 132*a* emit a signal as soon as the summation values at the outputs of the summation circuits exceed a given threshold. The discriminator circuit 133 then determines at which of the threshold detectors this first occurred and produces at its output, for example, a logic "I" when the output signal of the threshold circuit 131*a* arrives earlier, and a logic "0" when the output signal of the threshold circuit 131*a* arrives later than that of the other threshold circuit 132*a*. Together with the summation values formed in the summation circuits 131 and 132 this information now passes to the next store 14. As will be explained hereinafter, the output information of the discriminator circuit indicates the direction of the relative positional distance between the sample and the original.

Figure 12:
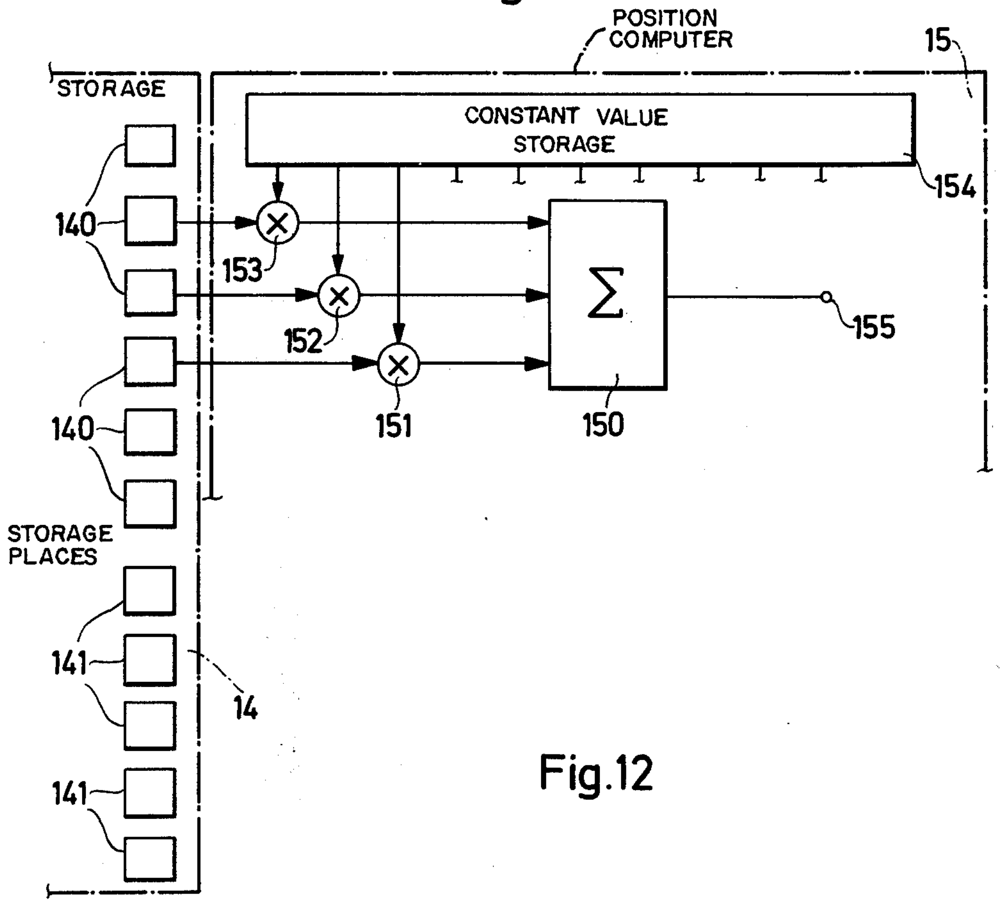

A block diagram of the position computer 15 is shown in FIG. 12. It comprises a constant value store 154 and a number of substantially identical computing circuits each having multipliers 151 to 153 and a summator 150, only one of such circuits being shown for the sake of simplicity. The number of computing circuits depends on the way in which the objects for comparison are divided up into sections, as will be described hereinafter. One input of each multiplier is cconnected to a storage place of the constant-value store 154 and another input to the storage places 140 or 141 of the store 14 connected in series with the position computer 15. The outputs of the multipliers are connected to the inputs of the associated summator. The outputs 155 of the individual summators 150 have position values $P_j$, which are related, via the equation $P_j = \Sigma_i K_{ij}.S_i$, to a specific number in each case of the sum values $S_i$ stored in the store 14, $K_{ij}$ denoting the multiplication constants stored in the constant-value store. The significance of these position values is explained hereinafter.

As already stated hereinbefore, determination of the relative positions between the sample $D_P$ and the originals $D_T$ and $D_O$ by means of common orientation of the text edges, is inadequate. According to a method in accordance with this invention, therefore, a plurality of selected small positioning text zones distributed over the entire text area are used for the measurement. The relative position of corresponding zones of the sample and the original are determined and the relative positions of the individual text points are determined therefrom by calculation. Preferably, however, the relative position of corresponding text points is not computed individually; instead, the text area is divided up into individual sections and in an approximation sufficient in practice it is assumed that text points within corresponding sections have identical relative positions, so that only the relative positions of the invidividual corresponding sections need to be determined.

Figure 10:
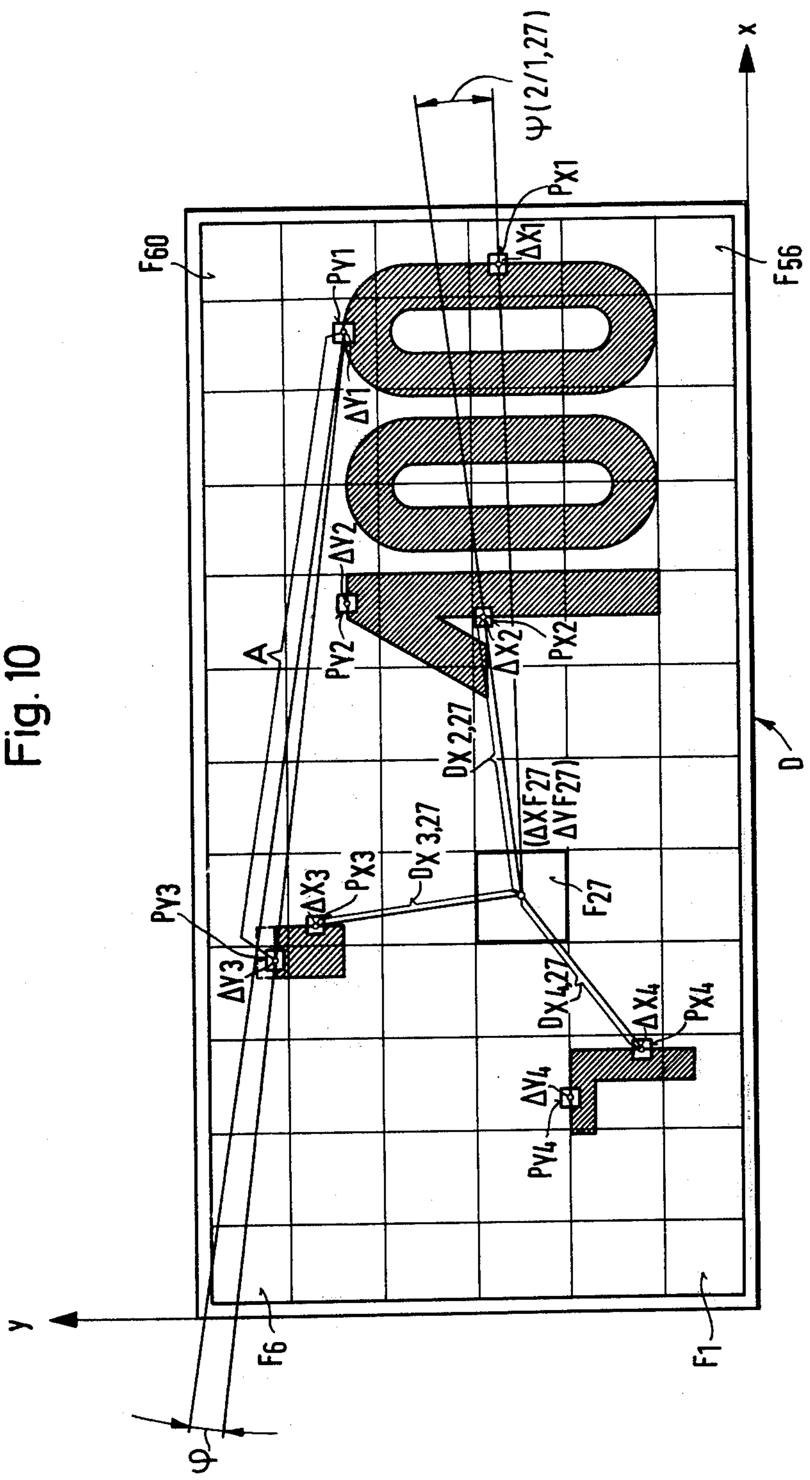
FIG. 10 illustrates a stylized banknote on which is superimposed the raster zones and the division into sections.

FIG. 10 is an example of the division into sections and the distribution and arrangement of positioning text zones. The printed text D is divided up into 60 sections $F_1 \ldots F_{60}$. Eight positioning text zones $P_{X_1} \ldots P_{X_4}$, $P_{Y_1} \ldots P_{Y_4}$ are distributed over its surface. The selection or arrangement of these positioning text zones is such that they each comprise text portions having highly contrasting text edges, the text edges in the $P_X$ zones being at right angles to those in the $P_Y$ zones. In addition, the text edges should, as far as possible, extend in the axial or in the circumferential direction of the gripper drums. The advantages of such a positioning text zone selection will immediately be apparent from the following.

A further criterion for selection of the positioning text zones lies in the differences between the contents of the individual originals. Referring to FIG. 1, the positioning text zones are so selected, for example, that some of them fall on those parts of the text where sample $D_p$ contains only information from one or other printing process, but not from both printing processes simultaneously. For example, the positioning text zones $P_{X(T)}$ and $P_{Y(T)}$ of the sample fall only on a portion of the text applied by the intaglio process, as will be immediately apparent from the offset original $D_O$, which contains no information at the corresponding places. Similarly, the positioning text zones $P_{X(O)}$ and $P_{Y(O)}$ fall on purely offset-printed portions of the text. For measurement of the text zone relative positions, of course, the corresponding original positioning text zones $P_X{}^*{}_{(T)}$, $P_Y{}^*{}_{(T)}$, and $P_X{}^*{}_{(O)}$, $P_Y{}^*{}_{(O)}$ on the associated originals $D_T$ and $D_O$ must be used.

For an understanding of the following it must be remembered that the concept of a positioning text zone relates to the text, i.e., designates a specific section of the text area of the sample or original. Against this, raster zones, which term is hereinafter used to designate groups of raster points of the scanning raster, is related to the scanning raster and is in effect stationary. In other words, corresponding raster zones of the different scanning systems contain raster points with exactly the same serial numbers.

The relative position of two associated positioning text zones on the sample and the original is now determined by selecting and thus fixing an appropriate raster zone to coincide with the positioning zone on the original, and then determining for the sample and the original the reflectance values in the individual raster points of this raster zone which is fixed for all the scanning systems, and comparing them with one another. If the sample is not identically aligned with the original at every point of the text in respect of the scanning rasters, the sample positioning text zone will not coincide with the stationary raster zone and the reflectance values in the raster points of the sample will therefore not coincide with those of the original. The degree of coincidence is then evaluated, as described hereinafter, for determination of the relative position.

Selection of the raster zones and hence of the positioning text zones is effected electronically, in control stage 17 by appropriate programming of the preselection store 173.

Figure 2:
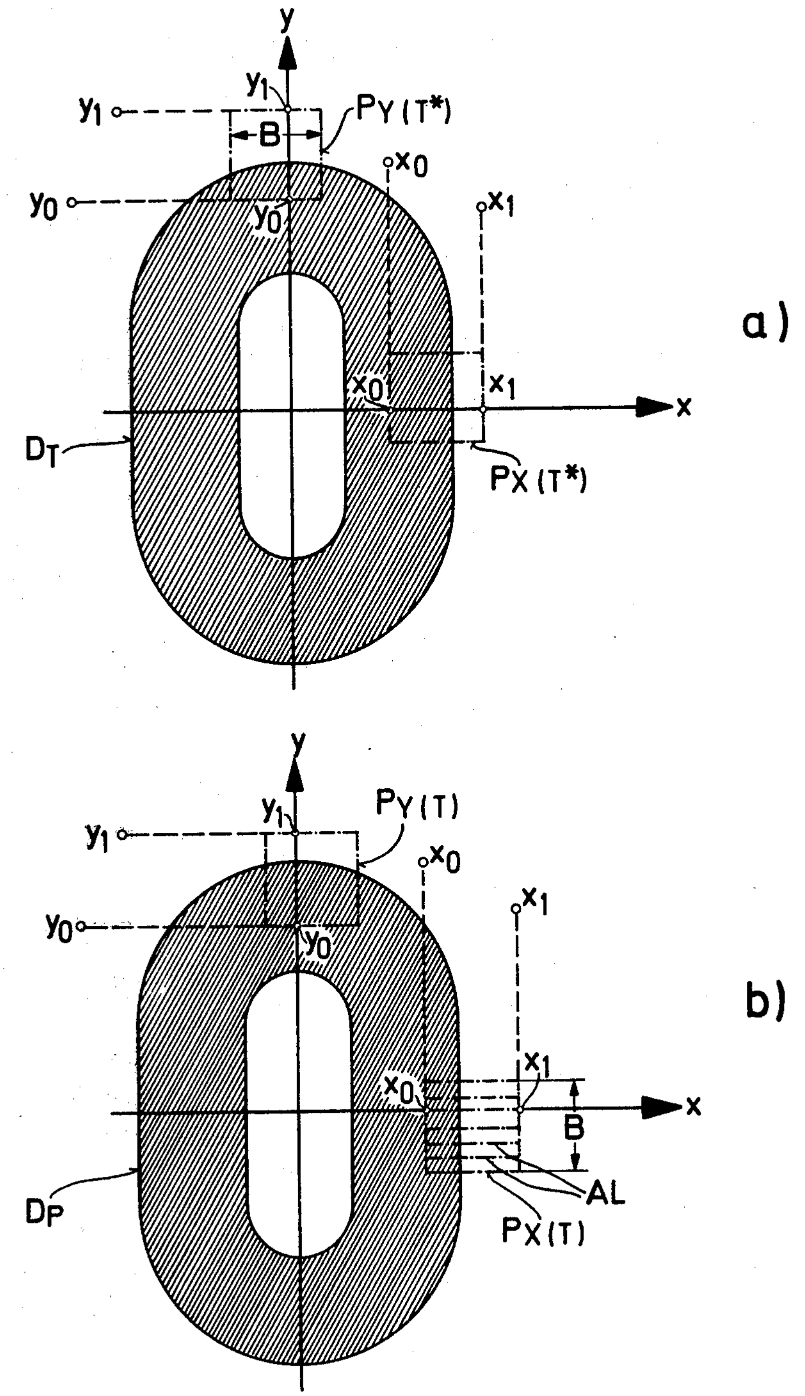
FIG. 2 shows details of FIG. 1 to an enlarged scale.
Figure 3:
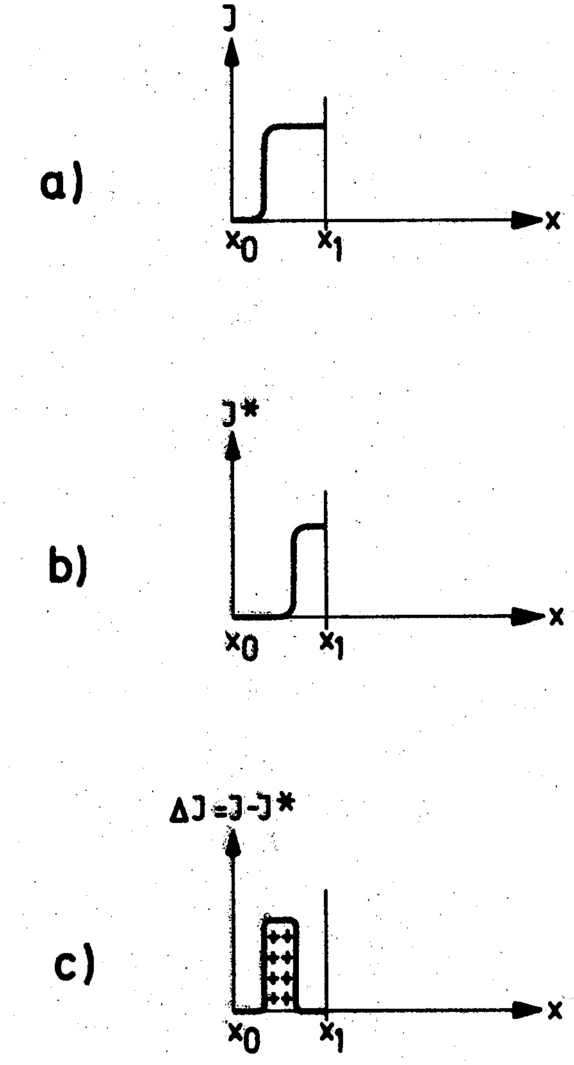

FIG. 2 shows a detail of the text of the sample $D_P$ and the intaglio original $D_T$ on an enlarged scale. The chain-dotted squares denote the position of the raster zones in relation to the text detail on the sample and the original. FIG. 3*a* shows the reflectance curve I in raster zone $P_{X(T)}$ of the sample on one line of scan in the X-direction (peripheral direction of the gripper drum) from $X_0$ to $X_1$. FIG. 3*b* shows the reflectance curve I along the same raster line in the case of the original. FIG. 3*c* is the curve showing the difference $\Delta I$ of the reflectance values. The area under the difference curve $\Delta I$ is a measure of the relative position $\Delta X$ of the associated positioning text zones with respect to the X-direction. A positive area means that the original is shifted in the plus-X direction as compared with the sample or the original positioning text zone under investigation in comparison with the corresponding positioning text zone on the sample.

In practice, of course, it is not just a single raster line, but the entire raster zone, that is scanned. Averaging over the individual scanning lines can then be carried out to compensate, for example, for the influence of any printing irregularities.

Figure 4:
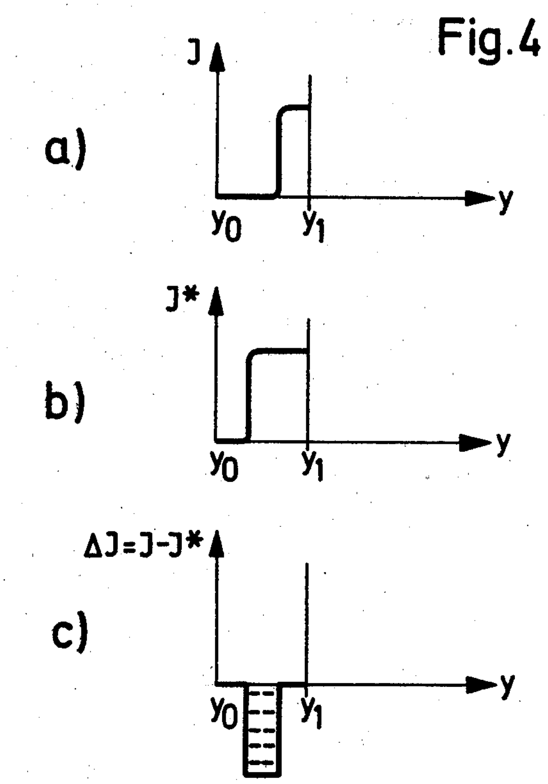

FIGS. 4*a* and 4*b* show the reflectance curves I and I* on scanning of the raster zones $P_{Y(T)}$ and $P_Y{}^*{}_{(T)}$ in the Y-direction (parallel to the gripper drum axis) along the same raster line from $Y_0$ to $Y_1$. FIG. 4*c* shows the curve for the reflectance difference $\Delta I = I - I^*$. The area of the reflectance curve is a measure of the relative position $\Delta Y$ of the associated positioning text zones with respect to the Y-direction. The negative area in this case means that the original is shifted in the minus-Y direction as compared with the sample in the positioning text zone under investigation.

Figure 5:
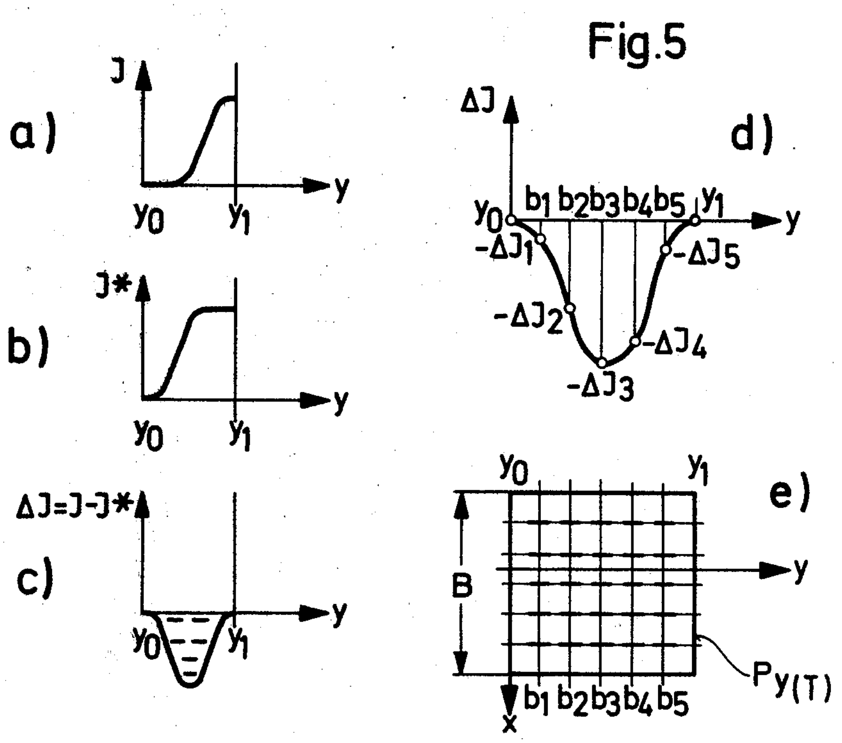

For the reasons explained hereinafter, it has been found advantageous to make the imaging of the printed texts on the photo-diode arrays somewhat unsharp. The reflectance curves are smoothed by the introduction of unsharpness. The reflectance curves given in FIGS. 4*a* to 4*c* are shown in FIGS. 5*a* to 5*c* in the case of unsharp imaging as an example.

The continuous reflectance curves shown in FIGS. 3*a* to 5*c* are ideal curves which would result from continuous scanning. The curves actually consist of discrete steps which result from scanning in discrete raster points.

In FIG. 5*d*, which shows the same reflectance difference curve as FIG. 5*c* but to an enlarged scale, the discrete raster points $b_1 \ldots b_5$ are plotted with their discrete reflectance difference values $\Delta I_1 \ldots \Delta I_5$. FIG. 5*e* shows a raster zone $P_{Y(T)}$ with raster points marked by minus signs.

As already stated, the areas of the reflectance diference curves form a measure of the relative positions $\Delta X$ and $\Delta Y$. These areas can now readily be determined by summation of the discrete reflectance-value differences along a raster line (within the raster zone concerned). The sum is taken not just over a single raster line, but over all the raster lines or all the raster points of the zone in question. This sum value $S_i$ is, of course, also a measure of the relative position of the associated positioning text zone, but without any random influence and is therefore more reliable.

Figure 6:
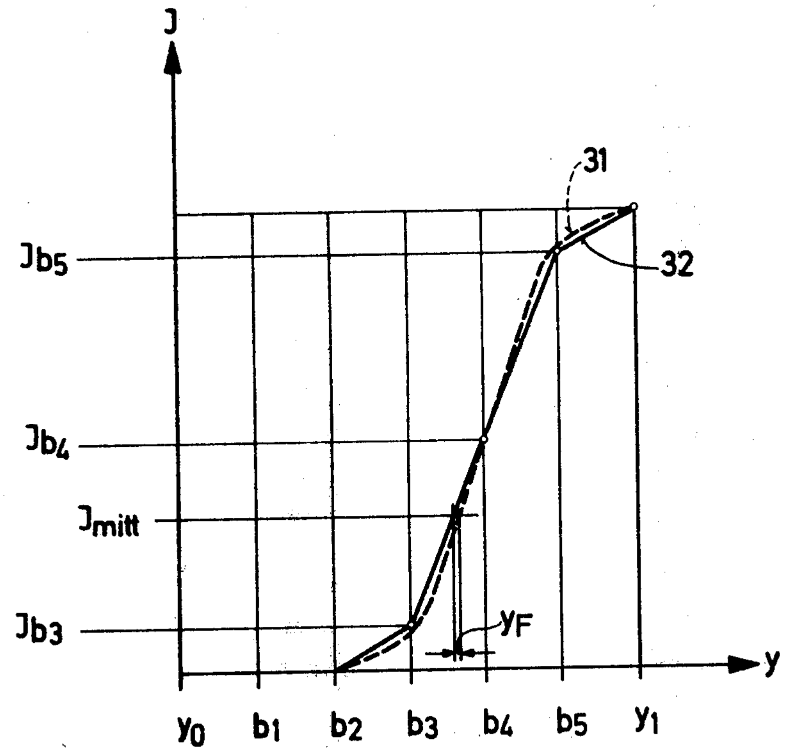

FIG. 6 shows a reflectance curve similar to FIG. 5*a* with plotted raster points $Y_0$, $b_1 \ldots b_5$, $Y_1$. A continuous curve line 31 is shown in broken lines (corresponding to FIG. 5*a*), while a curve line 32 is shown in solid lines being made up of individual straight lines connecting each pair of discrete reflectance values $I_b$. It will readily be seen that the position error $Y_F$ at I mitt occurring in the case of discrete scanning and linear interpolation between two discrete reflectance values (instead of continuous scanning with a continuous curve) is negligible at the steep points of the reflectance curve relevant to the determination of the relative positions.

Figure 7:
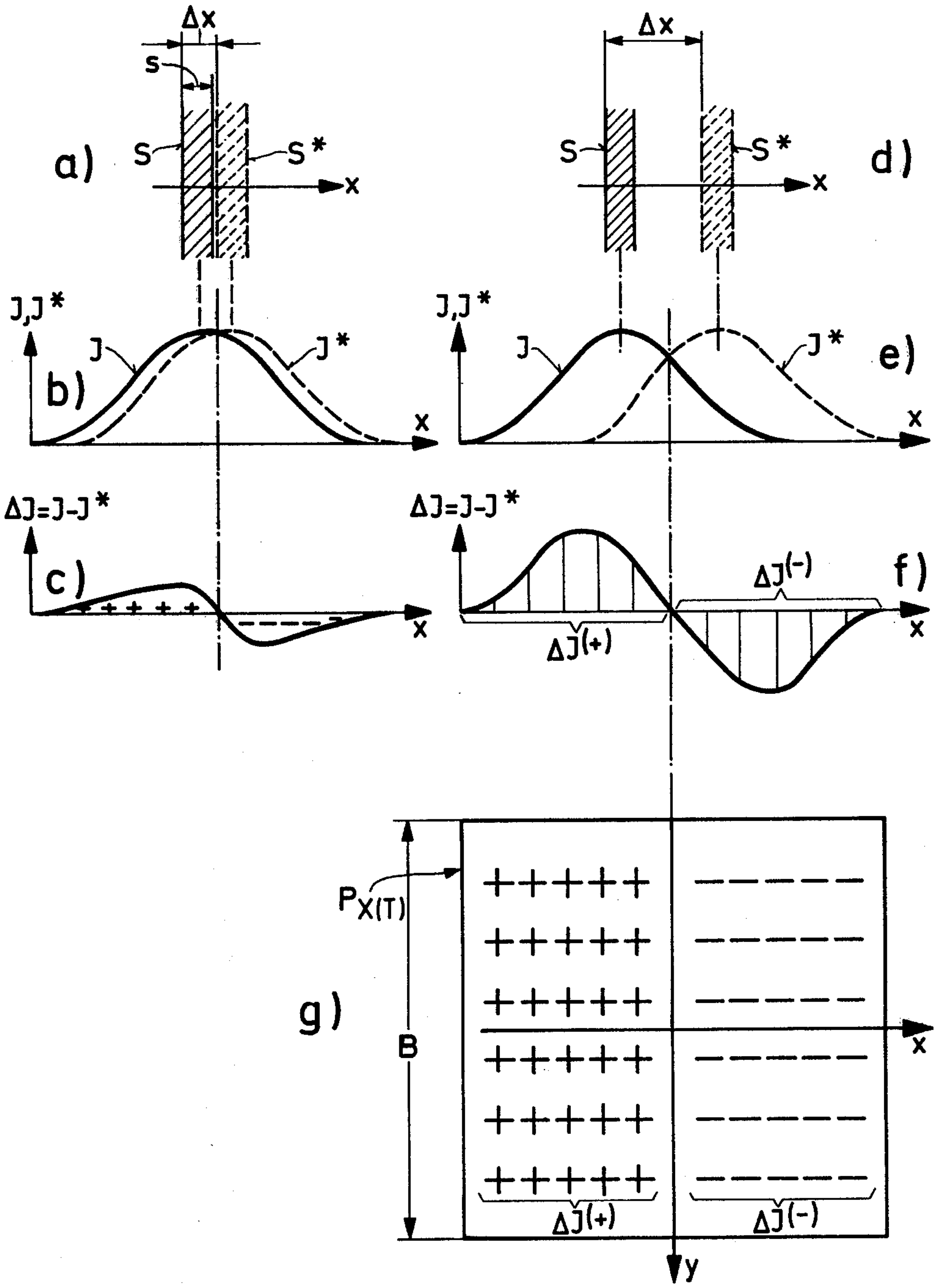

FIGS. 7*a* to 7*g* serve to explain the fact that the positioning text zones selected for determination need not necessarily always have a sharp text edge, i.e., two sharply contrasting substantially homogeneous zones with a relatively sharp boundary line, but that suitable positioning text zones may contain, for example, a line, i.e. a linear zone on a highly contrasting background zone. FIG. 7*a* shows the position of such a line S* on the original and a line S on the sample with respect to the stationary scanning raster represented by the coordinate axis X. FIG. 7*d* shows the same lines but with a larger distance $\Delta X$ between them. FIGS. 7*b* and 7*e* show the curves of the reflectances I and I* for the line arrangements according to FIGS. 7*a* and 7*d*, and FIGS. 7*c* and 7*f* show the corresponding reflectance difference curves $\Delta I$.

The main difference from the reflectance difference curves in the case of positioning text zones with text edges is that the reflectance difference values now occurring are not just of one sign, but of both signs. While the absolute value of the relative position $\Delta X$ is given solely by the sum of either the positive or negative reflectance differences extending over the entire raster zone area, the sign of the relative position depends on whether the positive or the negative reflectance differences first occur on scanning along a raster line. FIG. 7*g* shows a raster zone $P_{X(T)}$, in which those raster points in which positive reflectance differences occur in accordance with FIG. 7*f* are marked with a plus sign and the other raster points with a minus sign.

Evaluation of whichever sign first occurs with the reflectance differences is effected in the summation stage shown in FIG. 11.

Figure 8:
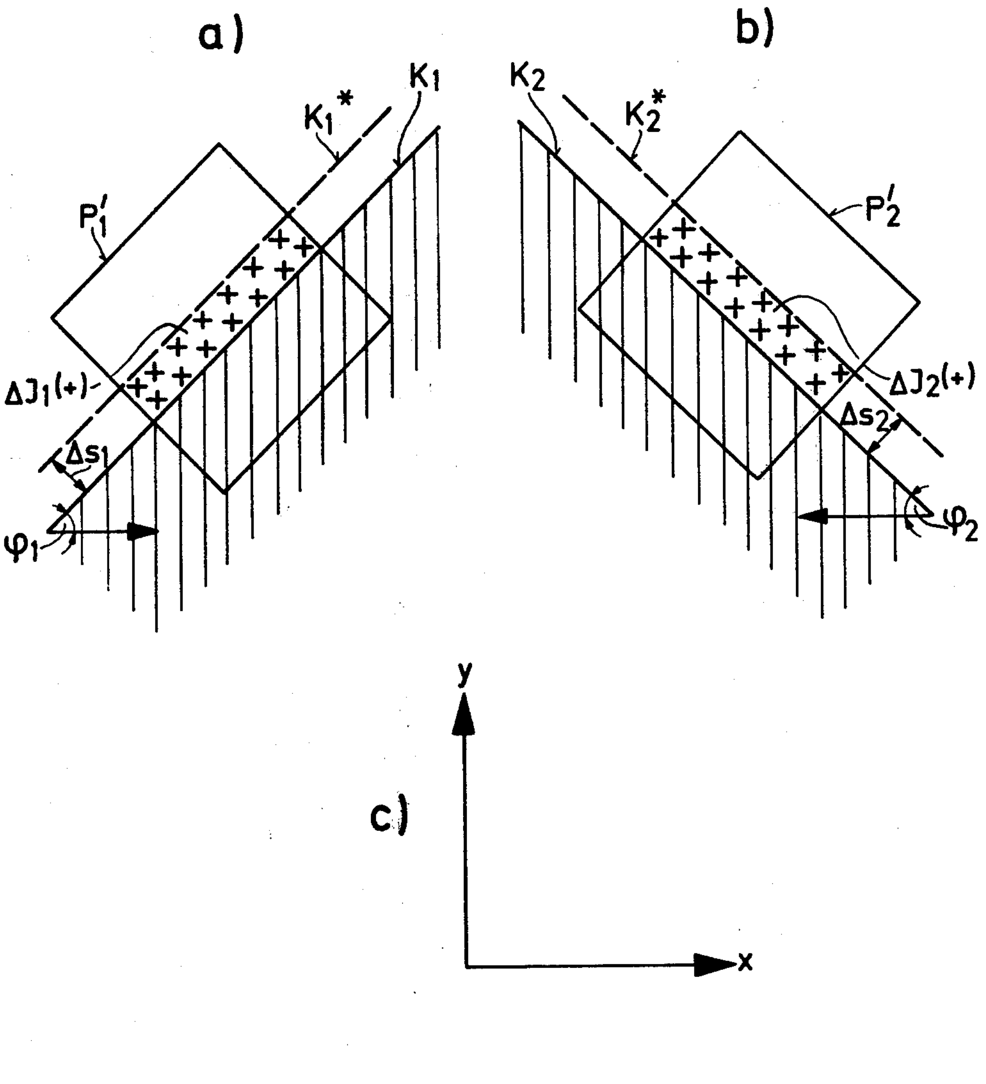

FIGS. 8*a* to 8*c* show that the text edges in the position text zones need not necessarily extend in parallel to the raster lines of the scanning raster (directions X and Y), but may also extend at an angle thereto. The two rectangular raster zones $P_1$ and $P_2$ in FIGS. $8_a$ and 8*b* are also inclined at an angle to the coordinate X axes (FIG. 8*c*). The text edges in the sample and the original are denoted by $K_1$, $K_1^*$ and $K_2$, $K_2^*$ respectively. The sums of the reflectance value differences measured at the raster points marked + are then a measure of the distance $\Delta S_1$ and $\Delta S_2$ between the associated text edges. The relative positions ΔX and ΔY of the positioning text zones can then be determined easily from these distances by way of the (known) angles $\zeta_1$ and $\zeta_2$ of the text edges to the coordinate axes.

Figure 9:
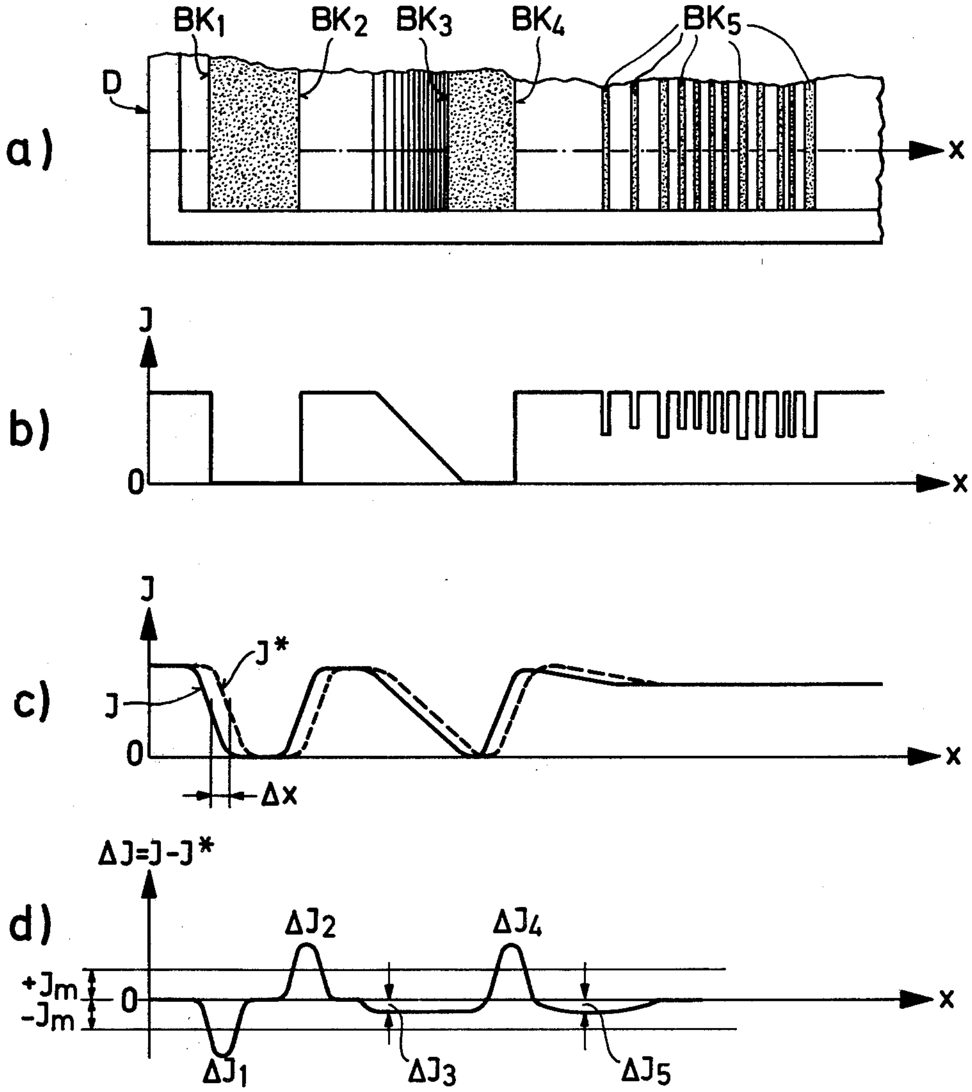
FIGS. 9*a* to 9*d* show reflectance curves to explain the low-pass filtering system.

FIGS. 9 to 9*d* show the influence of different text information structures on the required accuracy in determining the relative positions of the associated text zone. FIG. 9*a* shows three text structures successively in the X-direction as are typical of banknotes. The first structure is an area of homogeneous density with two defining text edges BK1 and BK2. The second structure is made up of a fine line structure and a homogeneous area, the line structure having a density which increases in the X-direction. The boundary edges of the homogeneous area are denoted by BK3 and BK4. The third structure comprises a row of coarser lines BK5. FIG. 9*b* shows the reflectance curves associated with the individual text structures in the case of sharp imaging. In FIG. 9*c*, the solid line shows the reflectance curve of the same text structures with unsharp imaging. The broken line shows the reflectance curve of an identical text structure which is imagined to be displaced by ΔX. FIG. 9*d* shows the curve of the differences of the two reflectance curves I and I* in FIG. 9*c*. It will be clear that relatively considerable difference values ΔI occur only at those points of the text structures which contain sharp text edges. The relative positions must therefore be determined very accurately in these portions of the text since even here very small displacements occurring between the sample and the original and not corrected by the relative position measurement can lead to faulty interpretation on comparing the sample with the original. Text portions having toned areas or coarser line structures are less suitable for determining the relative positions. The relative positions need not be determined so accurately here, however, because in such portions of the text relatively small positional deviations are not so important.

Generally, it will be possible practically always to select the positioning text zones so that they contain text edges extending parallel to the raster lines. However, the denser zones of these positioning text zones will hardly ever be homogeneous or consist of just a line structure with tone lines parallel to the text edge. As a rule, the tone lines will extend at an angle to the text edge so that the latter does not appear sharp but frayed. These frayed text edges can, however, be made artifically sharper by controlling the defocussing of the edges when imaging them on the photodiode arrays. Of course an electronic low-pass filter system could be used instead of unsharp imaging.

Referring to the foregoing, therefore, a series of positioning text zones, i.e. at least two but preferably 10 to 20 per original, are selected and the relative position in relation to the corresponding zone on the original is determined for each individual zone. As already stated, the sum values $S_i$ of the reflectance differences formed for each raster zone associated with a positioning text zone are then a measure of the relative positions ΔX and ΔY. On the basis of the special selection of the positioning text zones with text lines or text edges parallel to the raster lines, only the relative positions ΔX are present for certaining positioning text zones and only the relative positions ΔY for others. The former have the references $P_{X1} \ldots P_{X4}$ and the latter $P_{Y1} \ldots P_{Y4}$, as shown in FIG. 10.

Because of their selection criteria, the positioning text zones are generally distributed fairly irregularly over the text area. For comparing the sample with the originals, however, the relative positions of all the text portions must be available. Consequently, the print is now divided up as shown in FIG. 10 into, for example, genuinely equal sections, and the relative position (ΔX,ΔY) of the individual sections is calculated by interpolation and extrapolation from the relative positions of the positioning text zones nearest each section. Taking index j as the number of a section and the index i as the number of a sum value or a relative position ΔX or ΔY of the positioning text zone, the relative positions $\Delta X_{F_j}$ and $\Delta Y_{F_j}$ of the section $F_j$ are calculated in accordance with the following formulae:

$$\Delta X_{F_j} = \sum_i K_{X_{i,j}} \cdot \Delta X_i$$

$$\Delta Y_{Fj} = \sum_i K_{Y_{i,j}} \cdot \Delta Y_i$$

In these formulae, $K_{X_{i,j}}$ and $K_{Y_{i,j}}$ denote empirically determined interpolation constants depending essentially on the distance $D_{X_{i,j}}$ and $D_{Y_{i,j}}$ (FIG. 10) between the positioning zone of number i and the centre of the section of number j. The indices X and Y relate only to the allocation of the constants K to ΔX-positioning text zones or to ΔY-positioning text zones. Depending on the positions of the sections j the sums extend, for different values of j, over the same or over different i-values. For the section No. 27 shown in FIG. 10 the above formulae explicitly read as follows:

$$\Delta X_{F_{27}} = K_{X_{4.27}} \cdot \Delta X_4 + K_{X_{3.27}} \cdot \Delta X_3 + K_{X_{2.27}} \cdot \Delta X_2$$

$$\Delta Y_{F_{27}} = K_{Y_{4.27}} \cdot \Delta Y_4 + K_{Y_{3.27}} \cdot \Delta Y_3 + K_{Y_{2.27}} \cdot \Delta Y_3$$

These calculations are carried out in the position computer 15 already described. The constants K are stored in the constant store 154.

The following approximation formulae may also be used to fix the constants $K_{X_{i,j}}$ and $K_{Y_{i,j}}$:

$$K_{i,j} : K_{i+i,j} : K_{1+2,j} = \frac{1}{D^c_{i,j}} : \frac{1}{D^c_{i+i,j}} : \frac{1}{D^c_{i+2,j}}$$

where c is an empirical constant which may, for example, be 1. The formula is valid both for $K_{X_{i,j}}$ and also $K_{Y_{i,j}}$; the indices X and Y have therefore been omitted. The following conditions should also be satisfied:

$$O < K_{X_{i,j}} < 1 \, ; \, 0 < K_{Y_{i,j}} < 1$$

$$\sum_i K_{X_{i,j}} = 1 \sum_i K_{Y_{i,j}} = 1$$

In some cases it may be necessary to use not only the nearest positioning zones for calculation of the relative positions of the individual sections, but also positioning zones situated farther away, e.g. the zone $P_{X_1}$ (with the relative position $\Delta X_1$) for the section $F_{27}$ in FIG. 10. Since the positioning text zones farther away are to some extent screened by the nearer zones, their influence must be proportionally reduced, and this can be done, for example, by multipling the associated expression $K_{i,j} \cdot \Delta X_k$ by a screening factor sin $\Psi_{k,i,j}$, where the latter denotes the angle at which the distance between the screened positioning text zone $P_K$ and the screening positioning text zone $P_i$ appears from the centre of the section $F_k$.

Up till now only translatory relative displacements between the sample and the originals have been taken into account. Of course rotational displacement can also be included in calculating the relative positions of the corresponding sections. To this end, preferably, two positioning text zones situated as far apart as possible, e.g. $P_{Y1}$ and $P_{Y3}$ in FIG. 10, are selected and the angular displacement of the entire original from the sample is determined from their relative position difference (e.g. $\Delta Y_3 - \Delta Y_1$) by division by the distance between them.

In FIG. 1, only text information of a single printing method (only intaglio or only offset printing) was present in the selected positioning text zones. This is the optimum case, since with this system the independent relative position determination is not disturbed by the other type of print. The mixer stage 11 in such cases operates rather as an OR gate, since text information comes either only from the offset original or only from the intaglio original. However, it may be necessary to use positioning text zones in which information from both printing methods is present, e.g. a pronounced text edge from one printing method and a less pronounced line or tone structure from the other printing method. In that case, the mixer stage 11 acts as a superimposition print computer which from the individual reflectance values of the intaglio and offset originals calcuates the combined reflectance values which should correspond to those of the sample containing both prints. The resulting abrupt changes in reflectance at edges of the text, for example, after the mixer stage will be equal to those of the sample, so that the correct differential values can be formed in the subtraction stage.

As already described, selection of the raster zones and hence of the positioning text zones required for determining the relative positions of corresponding zones in the sample and originals is effected by appropriate programming of the correctable preselection store 173. Since the relative positions to be determined may be in a fairly large range, the positioning text zones must be selected to be relatively large to ensure that the subsequent processing produces a reliable result. However, the larger the positioning text zones are made, the less the expected accuracy and the longer the computing time required. To keep the positioning text zones as small in area as possible, their position is corrected by reference to a rough position measurement. To do this the relative positions ΔX, ΔY of specific selected position text zones are measured and supplied as correction values to the correctable preselection store. The other positioning text zones or raster zones are then corrected according to these selected relative positions. Selection of the relative position values or positioning text zones used for this correction is effected by the raster zone displacement stage 172 which has already been mentioned hereinbefore and which is suitably programmed. Of course, these raster zones or positioning text zones used for correction are so disposed that their scanning is complete before scanning the other positioning text zones.

It is also advantageous to select the positioning text zones or raster zones so that no raster point of a zone is situated in the same raster line (Y-direction) as a raster point of any other zone. The circuitry is thus simplified considerably for the summation of the reflectance differences, which is carried out separately for each raster zone.

For the sake of completeness it should be mentioned that at the start of each measurement the contrast between the original and the sample is adjusted so that approximately the same reflectance values for the same densities are obtained.

A description will now be given of the text comparator circuit, which has the general reference 28 in FIG. 1 and in which the reflectance values from corresponding text points of the sample and originals are associated with one another by reference to the relative position values available in the store 16, and are compared with one another and then error evaluation is carried out by reference to the results of the comparison.

The text comparator circuit 28 comprises three intermediate stores $10_P$, $10_T$ and $10_O$, two correlators 18 and 19 each connected to the position store via a line 40 and controlling the intermediate stores, a mixer stage 20, a subtraction stage 21 and an error computer 22.

The reflectance values of the sample and the originals pass from outputs 8 of A/D converter 7 to the intermediate stores 10, where they are provisionally stored. The reflectance values stored in the intermediate stores $10_T$ and $10_O$ are fed to the correlators 18 and 19 in accordance with the position values fed to them, and are associated in the mixer stage 20 in the same way as in the mixer stage 11 of the evaluation circuit 29. These associated original reflectance values are then subtracted in the subtraction stage 21, similarly to the subtraction stage 12, from the sample reflectance values which have also been fed from the intermediate store $10_P$ after a predetermined delay. The resulting reflectance differential values are then evaluated in the error computer 22 in accordance with specific evaluation criteria. The individual functions are again controlled by the central control unit 23.

For a better understanding of the operation of the correlators 18 and 19 and of the intermediate stores $10_T$ and $10_O$, FIGS. 14*a* to 14*c* will first be explained. These each show a detail of the identical scanning rasters of the three scanning systems, FIG. 14*a* relating to the sample FIG. 14*b* to the offset original and FIG. 14*c* to the intaglio original. The distance (K) between each two raster lines 41 is the same in both directions.

Figure 14:
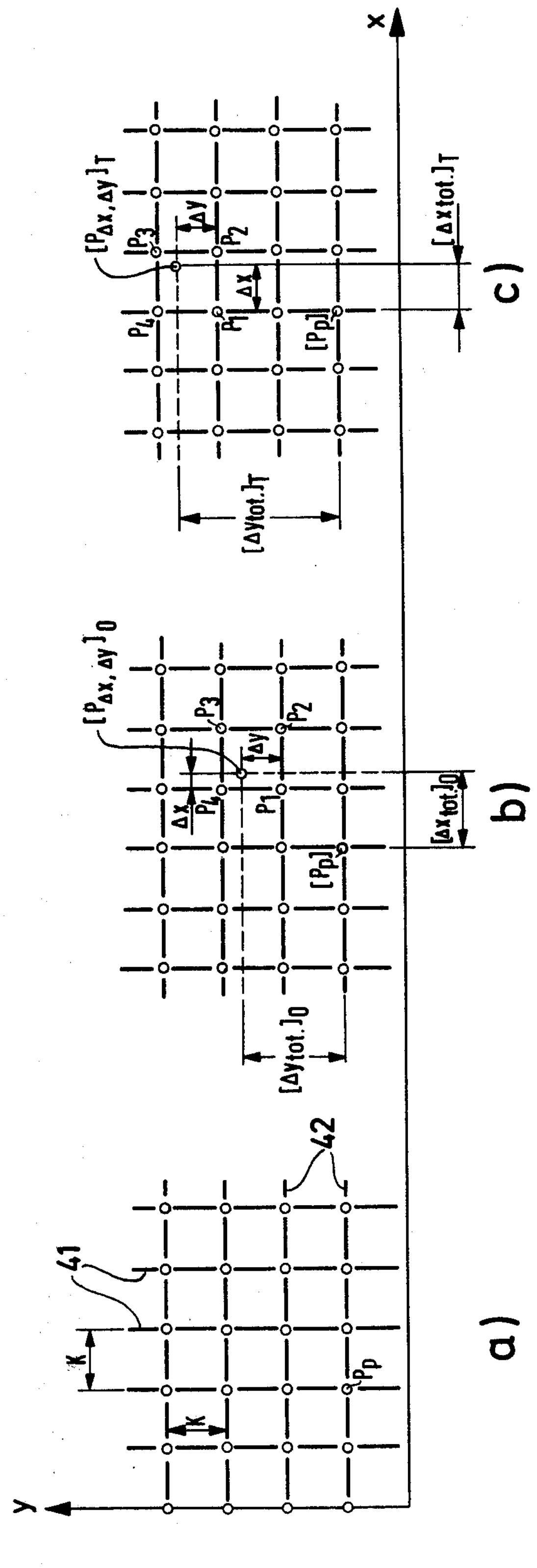
FIGS. 14*a* to 14*c* are details of scanning rasters.

FIG. 14*a* shows a selected sample text point reference $P_P$. As a result of inaccuracy, for example, when the sample and the originals are fixed on the drums, the origional text points corresponding to the sample text point $P_P$ will as a rule not coincide with the raster points $(P_P)$ of the original scanning raster, but will be at a varying distance therefrom $(\Delta X_{tot})_O$, $(\Delta Y_{tot})_O$, $(\Delta X_{tot})_T$, $(\Delta Y_{tot})_T$, e.g. at the intermediate points $(P_{\Delta X,\Delta Y})_O$ $(P_{\Delta X,\Delta Y})_T$. As a rule, as illustrated, these intermediate points will not coincide with a raster point but be situated somewhere between four surrounding raster points $P_1$ . . . $P_4$. The distance between the intermediate points and the surrounding raster point $P_1$ nearest the points $(P_P)$ in each case have the reference X and Y. The original reflectance values at these intermediate points are now determined from the original reflectance values in the respective four surrounding raster points, preferably by linear interpolation. These interpolation values are then passed to the mixer stage 20 exactly when they arrive at the subtraction stage 21 together with the reflectance value of the sample point $P_P$ from the intermediate store $10_p$.

Figure 15:
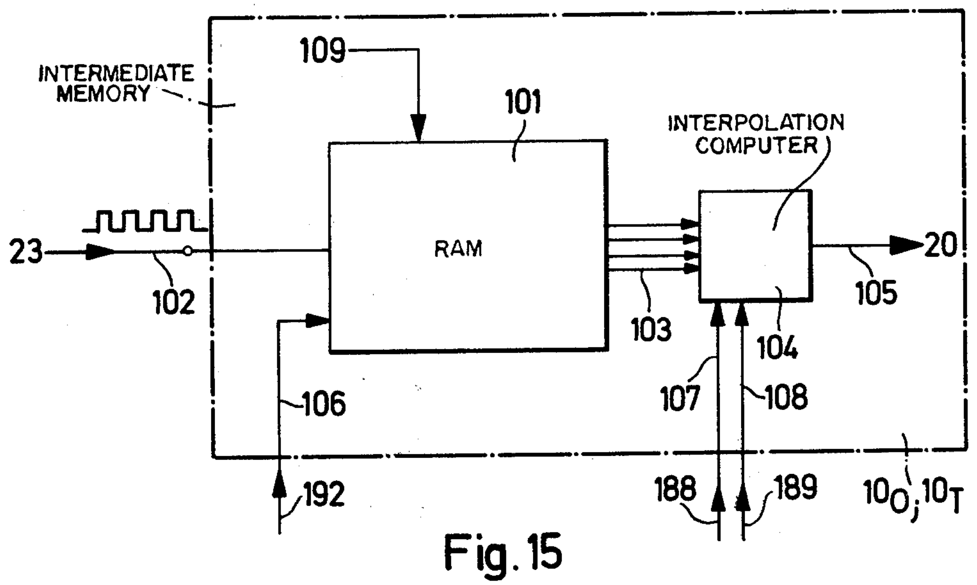
FIGS. 15 and 16 are block schematic diagrams of other details from FIG. 1.
Figure 16:
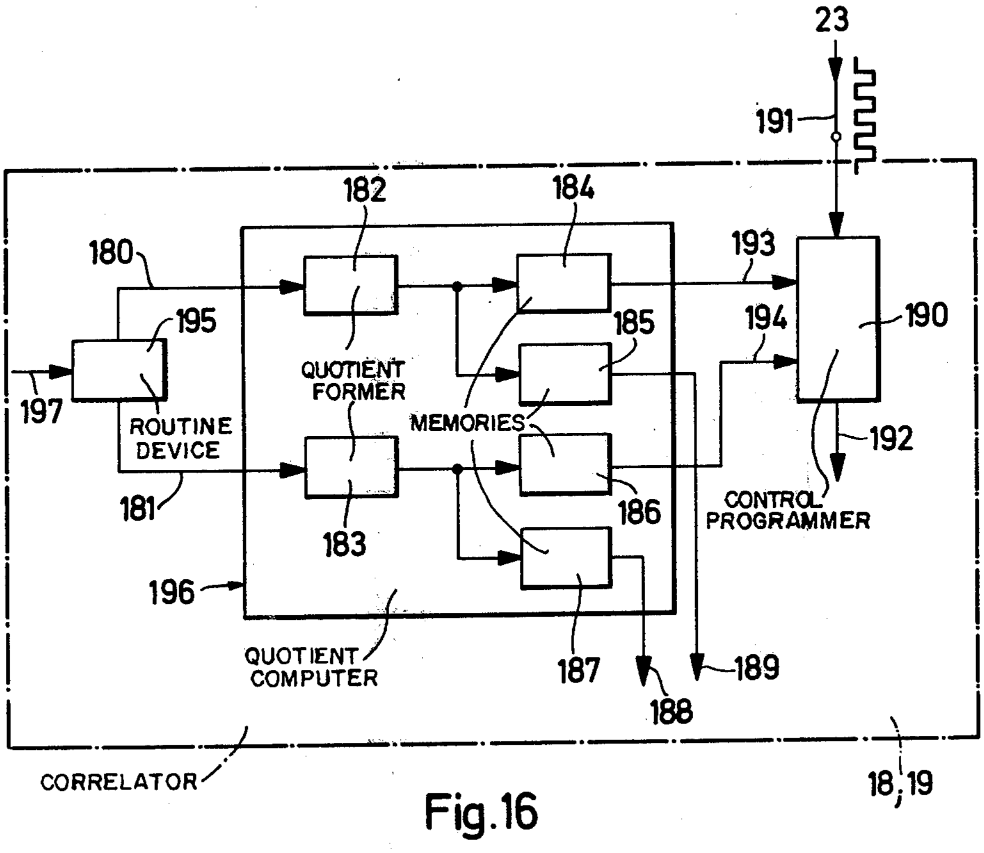

FIGS. 15 and 16 show the intermediate stores $10_O$ and $10_T$ for the originals and the correlators 18 and 19 in greater detail. Each of the two intermediate stores comprises a random access write-in store (RAM) 101 and an interpolation computer 104. The two correlators each comprise a routing device 195, two quotient formers 182 and 183, four stores 184, 185, 186 and 187, and a control programmer 190. The quotient formers and the stores and the stores are combined in a quotient computer 196.

The sample intermediate store $10_P$ contains in general only one RAM and is therefore not shown in detail.

The position values ΔX and ΔY (corresponding to $\Delta X_{tot}$ and $\Delta Y_{tot}$ in FIGS, 14b and 14c) determined in the measuring circuit 29 and fed to the correlators 18 and 19 via the leads 40 pass to the input 197 of the routing device 195 (FIG. 16). This passes the ΔX values to the quotient former 182 and the ΔY values to the quotient former 183. In these, the position values are divided by the raster distance K. The whole quotient values (whole numbers) are then fed to the stores 184 and 186, and remainders (proper fractions) are fed to the stores 185 and 187. The whole quotient values correspond to the distances $(\Delta X_{tot}-\Delta X)$ and $(\Delta Y_{tot}-\Delta Y)$ between the points $(P_P)$ and $P_1$ in FIGS. 14b and 14c, the remainders corresponding to the distances ΔX and ΔY between $P_1$ and the intermediate points $P_{(\Delta X,\Delta Y)}$. The whole quotient values are then passed via lines 193 and 194 to the control programmer which, according to these values, generates a selection timing pulse from the control timing pulse fed to its via lines 191 from the central control unit 23. The selection timing pulse on output 192 of the control programmer is fed via a line 106 to the RAM 101 of the intermediate store 10 (FIG. 15) respectively connected to the correlator.

The remainders from the stores 185 and 187 pass via lines 188 and 189 to the inputs 107 and 108 of the interpolation computer 104 of the associated intermediate store.

The reflectance values arriving from the outputs 8 of the A/D converters 7 are stored in the RAM's of the three intermediate stores. The control timing pulse fed via lines 102 to each RAM from the central contol unit ensures that reflectance values from raster points with the same serial number are stored in all three RAM's under the same address in each case.

From the RAM's 101 of the two intermediate stores $10_O$ and $10_T$, the reflectance values then pass via transfer lines 109 simultaneously from each four adjacent raster points to the associated interpolation computers 104. Selection of the four raster points is effected by the selection timing pulses produced by the control programmers 190. The interpolation computers 104 now determine the reflectance values of the intermediate points defined by the ΔX and ΔY values at the inputs 107 and 108 and pass these to the mixer stage 20 via the outputs 105. At the same time, the reflectance values of the sample raster points corresponding to the respective intermediate points are called from the RAM of the sample intermediate store $10_P$.

The interpolation itself is advantageously linear and is preferably effected in discrete steps by appropriate division of the raster distance K. The procedure may be such that two interpolation values are first formed between each pair of raster points on each raster line and then another interpolation process is carried out to determine the definitive reflectance value of the intermediate points from these interpolation values. Of course other interpolation processes are also possible.

Although the invention has been described above only in connection with the quality control of printed products, more particularly bank notes, it is obvious that the relative position measuring process according to the invention is also useful in connection with other information supports, e.g. magnetic cards or the like.

What is claimed is:

1. A method of determining the relative positions of corresponding image points of a two-dimensional original and a two-dimensional sample comprising the steps of:

electronically pointwise scanning the original in accordance with a raster which is stationary with respect to the original;

selecting a plurality of individual positioning zones equally from the original and the sample so that corresponding zones of the original and the sample consist of corresponding image points and said zones are comparatively small with respect to the total area of the original and the sample;

fixing the sample with respect to a further scanning raster which has the same geometrical properties as said stationary scanning raster;

electronically pointwise scanning the sample;

electronically processing the scanning data obtained from scanning the original and the sample so as to obtain first position data indicative of the relative position of said individual positioning zones of said sample pattern each with respect to an individual raster zone of said further scanning raster, each individual raster zone being defined by the raster points corresponding to those raster points of the respective individual positioning zone of the original; and interpolating and extrapolating the first position data so as to obtain second position data which is indicative of the relative position of the image points of the sample each with respect to an individual raster point of said further scanning raster, said individual raster points corresponding to those raster points of the stationary scanning raster which coincide with the respective image points of the original.

2. The method according to claim 1, including the step of successively determining the relative positions of a plurality of samples with respect to said original, and further comprising the step of storing scanning data from each scanned image point of the original and processing these stored data with scanning data obtained from successive scanning of said plurality of samples.

3. The method according to claim 2, further comprising the step of equally dividing up the original and the sample into individual sections and interpolating and extrapolating said first position data so as to obtain third position data in lieu of said second position data, said third position data being indicative of the relative position of said individual sections of the sample each with respect to an individual raster section of said further scanning raster, said individual raster sections including those raster points which correspond to the raster points of said stationary raster coinciding with the respective sections of the original.

4. The method according to claim 3 further comprising the steps of:

forming the difference between the scanning data from corresponding raster points of the original and the sample for each raster zone, and individually summing positive and negative differences over each individual raster zone, the positive and negative sum values constituting said first position data; and for each individual section interpolating and extrapolating the sum values from a number of raster zones spatially nearest the respective section, to thereby determine said third position data.

5. The method according to claim 1 further comprising the step of utilizing at least one of the methods of cross correlation and minimum error square sum to determine said first position data.

6. The method according to claim 1 further comprising the steps of forming the difference between the scanning data from corresponding raster points of the original and the sample for each raster zone, and individually summing positive and negative differences over each individual raster zone, the positive and negative sum values constituting said first position data.

7. The method according to claim 6 further comprising the steps of determining first position data from at least one positioning zone, selecting new positioning zones which are shifted with respect to the initial positioning zones according to said first positioning data from said at least one positioning zone, determining new first position data from said new positioning zones, and processing the new first position data to obtain second position data.

8. The method of claim 1 further comprising the step of selecting 2–40 positioning zones.

9. The method of claim 8 further comrpising the step of selecting the number and size of the positioning zones so that their total area is from 0.5% to about 10% of the total original area.

10. The method of claim 1 further comprising the step of selecting the size of the positioning zones so that the area of each zone is from 0.02% to 2% of the total original area.

11. The method of claim 1 further comprising the step of selecting and dimensioning at least one positioning zone so as to cover a zone of the original which contains only two adjacent substantially homogeneous portions with sharp relative contrast.

12. The method of claim 11 further comprising the step of selecting said at least one positioning zone so that the boundary between said two portions extends rectilinearly.

13. The method of claim 11 further comprising the step of selecting said at least one positioning zone so that the boundary between said two portions is parallel to an axis of the stationary scanning raster.

14. The method of claim 13 further comprising the step of selecting at least one other positioning zone on the same criteria and so that the boundary of at least one positioning zone is at least approximately perpendicular to the boundary of at least one other positioning zone.

15. The method of claim 1 further comprising the step of selecting and dimensioning at least one positioning zone so as to cover a zone of the original which contains only two adjacent substantially homogeneous portions with sharp relative contrast.

16. The method according to claim 1 wherein, the sample represents a printed product having contents applied by different printing processes, further including the steps of using separate originals having different contents according to the different printing processes and a predetermined relative association of the image points, and determining the relative positions of the image points of the sample to those of the originals separately for each original.

17. The method of claim 16 further comprising the step of selecting at least one positioning zone so as to cover a zone of the sample whose content originates solely from the same printing method as that of a selected original.

18. The method of claim 16 further comprising the step of electronically associating scanning data from associated raster points of the originals so that the resulting associated scanning data are directly comparable to the scanning data from the sample raster points.

19. The method of claim 1 further comprising the step of low-pass filtering the scanning data before processing said data.

20. The method of claim 19 further comprising the step of obtaining low-pass filtering by unsharp imaging of the raster points on a photo-electric transducer when utilizing photo-electric scanning.

21. Apparatus for determining the relative positions of corresponding image points of an original and a sample, comprising:

a first scanning device for scanning the sample point by point to generate scanning values at each individual scanning raster point;

a first means for scanning the original point by point to generate scanning values at each individual scanning raster point and for storing these scanning values;

a selection stage which selects from all the scanning values only those values which originate from corresponding raster points in corresponding raster zones of the sample and the original;

a subtraction circuit for forming the differences between the selected scanning values from the sample and the original;

a summation stage controlled by the selection stage for forming sum values of positive and negative scanning value differences separately according to the sign for the raster points of each raster zone; and a position computer which interpolates and extrapolates said sum values from the individual raster zones for at least a predetermined number of image points with respect to their respective distance from said raster zones to obtain position values indicating the relative position of said image points of the original and the sample.

22. The apparatus of claim 21, wherein said first scanning and storing means comprises a first scanning device, a first storage means, and switching means for connecting said first scanning device to said first storage means.

23. The apparatus of claim 22, wherein said first scanning device is an imaging optical system which is adjusted to focus the image of the scanned text.

24. The apparatus of claim 23, wherein said first scanning device has an array of photo-diodes onto which the image of said text is focussed.

25. The apparatus of claim 21, comprising a storage means coupled to said summation stage for storing the sum values of the individual raster zones, wherein said position computer is connected to said storage means and forms a predetermined number of position values ($P_j$) from the individual sum values ($S_i$) in accordance with the equation $P_j = {}_i K_{ij} \cdot S_i$, wherein $K_{ij}$ are constants depending on the distance between a raster zone which is indexed i and a raster point which is indexed j.

26. The apparatus of claim 21, wherein said selection stage includes a displacement stage which selects sum values associated with predetermined raster zones from the sum values formed by said summation stage and displaces the selected zones in the selection stage in relation to the scanning raster in accordance with the selected sum values.

27. The apparatus of claim 21, including at least one additional means for scanning an original point by point to generate scanning values at each individual scanning raster point and for storing these scanning values, and a mixer stage coupled to the selection stage for associating the selecting scanning values of the first scanning and storing means with those of the at least one additional scanning device.

28. The apparatus of claim 27, wherein said at least one additional scanning and storing means includes a scanning device of said first scanning and storing means, at least one additional storage means, and switching means for connecting said scanning device to said at least one additional storage means.

29. The apparatus of claim 27, wherein said mixer stage is a multiplication stage.

30. Apparatus for determining the relative positions of corresponding image points of an original and a sample comprising:

a first scanning device for scanning the sample and the original point by point to generate scanning values at each individual scanning raster point;

a storage means having a plurality of stages for storing scanning values produced by the scanning of said original by said first scanning device;

a selection stage which selects from all the scanning values those values which originate from corresponding raster points in corresponding raster zones of the sample and the original;

a subtraction circuit for forming the differences between the selected scanning values from the original and the sample;

a summation stage controlled by the selection stage for forming the sum values of positive and negative scanning value differences separately according to the sign for the raster points of each zone; and a position computer for processing said sum values to obtain position values of corresponding image points of the sample and the original with respect to a stationary coordinate system.

* * * * *